(12) United States Patent
Vaught

(10) Patent No.: US 8,365,425 B2
(45) Date of Patent: Feb. 5, 2013

(54) CHART SPECIFIC NAVIGATION PLOTTER AND METHOD FOR INEXPENSIVE PRODUCTION THEREOF

(76) Inventor: Gregory V. Vaught, Port Orchard, WA (US)

( * ) Notice: Subject to any disclaimer, the term of this patent is extended or adjusted under 35 U.S.C. 154(b) by 269 days.

(21) Appl. No.: 12/941,655

(22) Filed: Nov. 8, 2010

(65) Prior Publication Data

US 2012/0110865 A1    May 10, 2012

(51) Int. Cl.
  *B43L 13/00* (2006.01)
(52) U.S. Cl. ............................................. 33/431; 33/1 B
(58) Field of Classification Search ............... 33/1 B, 33/1 C, 1 SC, 431, 457, 494
  See application file for complete search history.

(56) References Cited

U.S. PATENT DOCUMENTS

| | | | | |
|---|---|---|---|---|
| 2,339,516 A * | 1/1944 | Quillen | ........................... | 33/431 |
| 2,545,835 A * | 3/1951 | Wilson et al. | ................. | 335/274 |
| 3,063,626 A * | 11/1962 | Kritser | ..................... | 235/61 NV |
| 3,187,434 A * | 6/1965 | Casagrande | .................... | 33/1 R |
| 4,491,724 A * | 1/1985 | Murray | ........................... | 33/431 |
| 4,802,283 A * | 2/1989 | Trump | ........................... | 33/431 |
| 4,969,271 A * | 11/1990 | Sump | ............................... | 33/431 |
| 5,007,174 A * | 4/1991 | Cook | ........................... | 33/1 SD |
| 6,026,579 A * | 2/2000 | Autrey | ........................... | 33/431 |
| 6,158,135 A * | 12/2000 | Rank | ............................... | 33/494 |
| 2012/0151787 A1 * | 6/2012 | Phillips | .......................... | 33/484 |

* cited by examiner

*Primary Examiner* — G. Bradley Bennett
(74) *Attorney, Agent, or Firm* — Lowe Graham Jones PLLC

(57) ABSTRACT

A navigational plotter for use with a selected navigational chart and its method for production include providing a generally transparent elongated planar straight edge member having each of a first and a second straight edges parallelly disposed opposite one another bounding a generally rectangular interior surface. A printed central axis bisecting the rectangular interior surface and at least one compass rose arranged to have its North/South ordinal points to lie upon the printed central axis thus to allow the user to maintain orientation of the plotter on the chart. A first distance scale is calibrated in accord with the scale of the selected chart along a selected line of latitude. The first distance scale is printed to span the East/West ordinal points on the compass rose and along the first straight edge. A second distance scale is calibrated in accord with longitude according to a Mercator projection.

20 Claims, 7 Drawing Sheets

CHART SPECIFIC NAVIGATION PLOTTER AND METHOD FOR INEXPENSIVE PRODUCTION THEREOF

FIELD OF THE INVENTION

This invention relates generally to naval and aerial navigation.

BACKGROUND OF THE INVENTION

The paper chart and magnetic compass lie at the very foundation of navigation. Ever since the first explorers began to navigate the seas better navigational practices, equipment and charts have also been explored and discovered. Currently, N.O.A.A. (National Oceanic and Atmospheric Administration) and others publish a variety of charts to facilitate safe navigation, including one of the best and most widely known types of charts used for navigation today called the "Mercator projection."

Despite the automated abilities present in electronic navigational chart systems, certain limitations still exist. Furthermore, inherent in the very nature of electronic systems is the reliance upon external power. Prudent navigators still maintain their proficiency by planning, preparing, and tracking their voyages upon paper charts.

Either as a substitute for and an augmentation to electronic aids to navigation, paper charts remain at the bedrock of navigation. Paper charts are segments of a Mercator projection of the global surface of the earth onto a cylindrical map that is unrolled as flat on the navigation table. First presented by the Belgian, Flemish geographer and cartographer Gerardus Mercator, in 1569, the Mercator projection became the standard map projection for nautical purposes because of its ability to represent lines of constant course, known as rhumb lines or loxodromes, as straight segments.

Positions of places shown on a chart can be measured from the latitude and longitude scales on the borders of a standard chart. The advantage of Mercator projections is that it is a conformal projection, which is to say that the projection preserves angles locally. Thus, because the bearing angles are preserved, such charts facilitate what is known as dead reckoning navigation. Dead reckoning (DR) is the process of estimating one's current position based upon a previously determined position, or fix, and advancing that position based upon known or estimated speeds over elapsed time, and course. Dead reckoning begins with a known position, or fix, which is then advanced, mathematically or directly on the chart, by means of recorded heading, speed, and time.

A bearing is the angle between the line joining the two points of interest and the line from one of the points to the north, such as a ship's course or a compass reading to a landmark. The basis of the Mercator projection is to preserve bearings. The Mercator projection, distorts distance but does so in a predictable manner. Specifically, degrees of latitude and the distances on the surface of the earth those degrees represent remain relatively constant across a chart when the spread of latitude is small. However, an unavoidable east-west stretching of the chart occurs, such that degrees of longitude become progressively short as the as distance away from the equator increases. Likewise, to preserve the angles, the north south distances are also stretched by a value also corresponding to distance from the equator. As a result, courses and bearings can be laid down on the chart to correspond to the actual angles of movement or sighting. Nonetheless, this preservation of angles comes at the cost of a predictable and calculable distortion of scale.

On nautical charts, the top of the chart is always true north, rather than magnetic north, towards which a magnetic compass points. Most charts also include a compass rose depicting the variation between magnetic and true north. They must also include cartographic scales to allow for the estimation of distance reflecting displacement on the chart. (Cartographic scale refers to the depicted size of a feature on a chart relative to its actual size in the world.) Because scale in a Mercator projection necessarily varies based upon distance from the equator and also the rate of variance also changes from place to place. At latitudes greater than 70° north or south, the Mercator projection is practically unusable. Yet, nearly all navigation occurs between 70° north and 70° south (Tromso, Norway being at 69° 40'N and Tierra del Fuego resting at 55°, 01' S and there being no cities to the south within the Antarctic Circle), and thus the projection is extremely useful for marine navigation. In chartable areas, however, scale is necessarily provided in a legend on each chart.

Navigation charts have the advantage of portraying a proportionately small portion of the surface of the globe as opposed to the full Mercator projection. To that end, each chart can be scaled in accord with the use of the chart rather than to correspond to the scale of a full Mercator projection from 70° north to 70° south. Thus, a conventional chart will generally be drawn to have a standardized scale for the segment of the projection that is the subject of the chart. The scales of nautical charts range from 1:2,500 to about :5,000,000. Graphic scales are generally shown on charts with scales of 1:80,000 or larger, and numerical scales are given on smaller scale charts. NOS charts are classified according to scale as follows:

Sailing charts, scales are generally at 1:600,000 and smaller, and are for use in fixing the mariner's position approaching the coast from the open ocean, or for sailing between distant coastwise ports. On such charts the shoreline and topography are generalized and only offshore soundings, principal lights, outer buoys, and landmarks visible at considerable distances are shown.

General charts, scales are generally 1:150,000 to 1:600,000, and are used for coastwise navigation outside of outlying reefs and shoals.

Coast charts, scales are drawn in the range of 1:50,000 to 1:150,000, and are for inshore navigation leading to bays and harbors of considerable width and for navigating large inland waterways.

Harbor charts are drawn to scales larger than 1:50,000, for harbors, anchorage areas, and the smaller waterways.

Special charts, various scales, cover the Intracoastal waterways and miscellaneous small-craft areas.

One such standardized scale on the North South axis of the projection is 1:40,000. The East to West axis still varies as a function of the displacement from the Equator.

Because the key to navigation on a Mercator projection is the preservation of angles on the chart and their correspondence to angles on the earth's surface, orienting a straight edged rule in accord with an angle is an invaluable means of making fixes and laying down courses on a chart. To accomplish this, a number of instruments known as plotters have been invented and sold to aid mariners in keeping a straight-edge oriented against a chart.

The Weems Parallel Plotter has been widely used for many years and is still relied upon today to satisfy many plotting navigational needs. Made of clear plastic it has various scales, a straight-edge and in some models a protractor. To maintain the orientation of the straightedge, the plotter includes rollers that allow translational movement of the Weems Plotter, and the straightedge it includes, over a paper chart while maintaining its orientation relative to the chart. In such a fashion, the Weems Plotter may be oriented on a compass rose and then by translational movement rolled to a current fix to establish a next leg in a course. The Weems Plotter is similarly used to mark bearings and with the bearings, to establish a fix. Despite its advantages, the WEEMS plotter also has some significant drawbacks and limitations for modern day use. To use the plotter appropriately, a very stable, expansive and platform is necessary to keep its rollers in full registration with the paper chart.

An improvement upon the WEEMS design is disclosed in U.S. Pat. No. 4,190,960, issued Mar. 4, 1980 to Warner. The improved plotter has a circular rotatable disk mounted on the body of the plotter with 360 degrees marked thereon. The disk must be rotated to determine the compass course of the flight path. The disk, then, can be used to maintain an angle relative to true north. Like the WEEMS, however, the Warner plotter is not suitable for use on a paper chart in a small craft.

Yet another plotter that attempts to improve on both these designs is U.S. Pat. No. 6,658,746 to Ganivet (Dec. 9, 2003). It's called a "PLOT'TIMER" and is designed for use with a marine or aeronautical chart; a one piece, thin, light weight, plastic, navigation plotter with at least one straight-edge and no moving parts. Used to determine true course, speed, and fuel requirements for a trip, it too calls for choosing various distance scales (miles, kilometers and statute & nautical miles). It has a reference point at the mid-point of the straight-edge (a small notch in the leading edge) and a boarder with angular markings representing the degrees of a compass rose. This plotter addresses fuel consumption and distance determination techniques. It is not a navigational tool at all.

All these plotters fail as a reliable, quick, and easy navigational tool. Each of these plotters can work well in optimal conditions, but all require; a level surface, steady, detailed manipulations and their readings can oft times be misread causing significant errors. In cramped quarters and unstable environments the use of rollers or sliding or rotating any of these plotters upon a chart table proves difficult and without a level surface it's hard to get even estimated bearings, distances and positions. In certain sea conditions these plotters are in and of themselves a navigational hazard underway; dangerous for overall use, especially in case of an EMERGENCY.

To ensure safe navigation what is needed is a chart plotter that is "Always Ready" to assist the navigator; especially in difficult conditions and in case of EMERGENCIES. What is lacking in the art is a ready easy means of applying a plotter that can be oriented to the chart without physical registration of rollers, thereby allowing rapid use in situations where sea conditions may not otherwise allow for the use of more primitive plotters.

SUMMARY OF THE INVENTION

A navigational plotter for use with a selected navigational chart and its method for production include providing a generally transparent elongated planar straight edge member having each of a first and a second straight edges parallelly disposed opposite one another bounding a generally rectangular interior surface. A printed central axis bisecting the rectangular interior surface and at least one compass rose arranged to have its North/South ordinal points to lie upon the printed central axis thus to allow the user to maintain orientation of the plotter on the chart. A first distance scale is calibrated in accord with the scale of the selected chart along a selected line of latitude. The first distance scale is printed to span the East/West ordinal points on the compass rose and along the first straight edge. A second distance scale is calibrated in accord with longitude according to a Mercator projection.

The inventive plotter maintains orientation to paper chart based upon latitude and longitude lines, a magnetic north south line drawn on the chart, or the compass rose.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
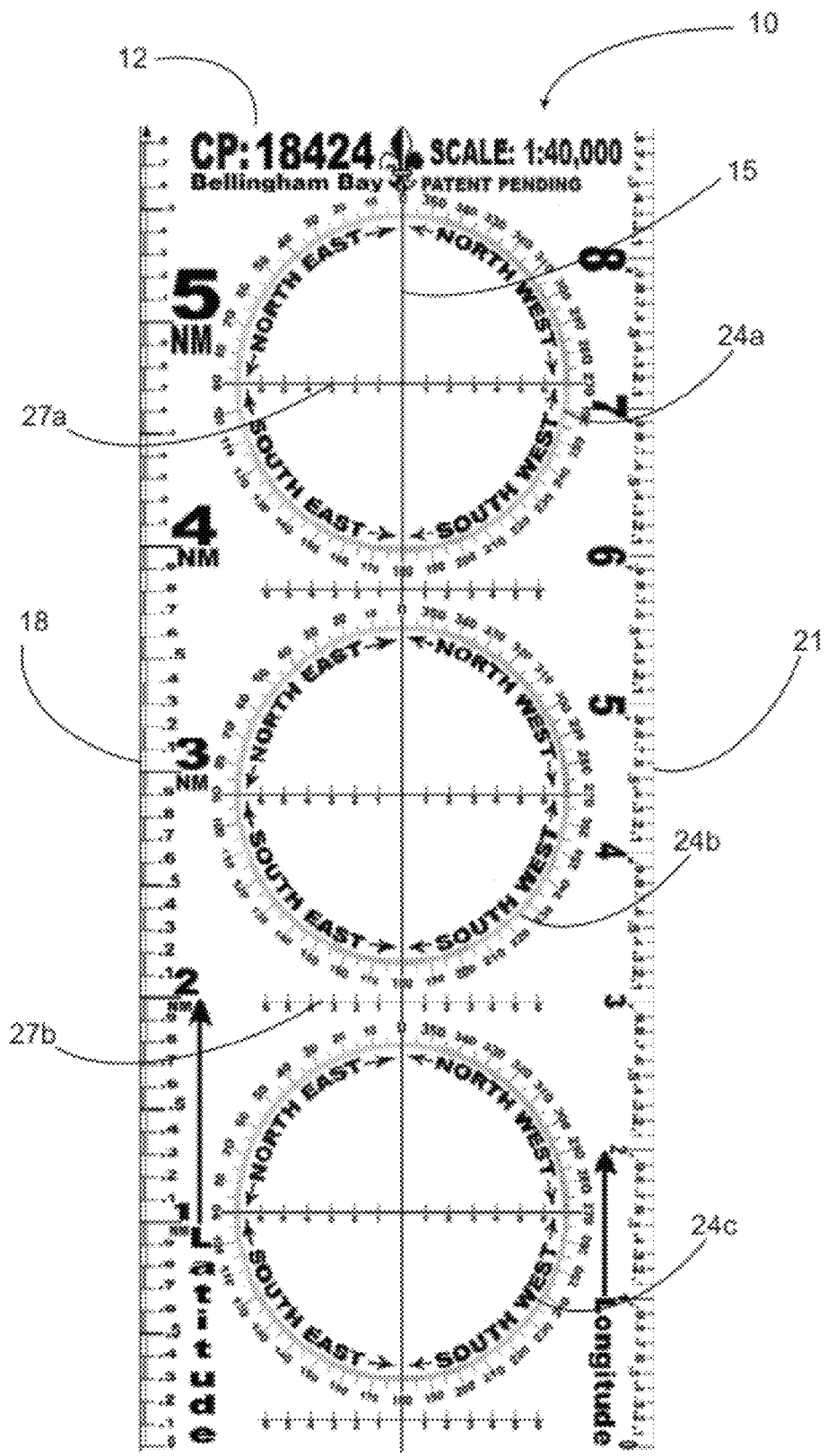
FIG. 1 depicts a nonlimiting embodiment of the inventive plotter (omitting a magnetic declination indicator to allow for clarity)

FIG. 1 depicts an inventive plotter 10 which comprises a legend 12 indicating the particular chart name and number as that chart is enumerated in the NOAA catalogue of navigation charts. NOAA is responsible for providing nautical charts for most of the nation, with a suite of over 1000 charts encompassing the coasts of the U.S., the Great Lakes, and the U.S. territories. The National Geospatial-Intelligence Agency (formerly NIMA) is responsible for producing deep water and charts in foreign waters. The U.S. Army Corps of Engineers produces charts on the Mississippi River and other inland waterways. For foreign waters, other local authorities produce suitable charts that will facilitate the use of the plotter equally. While this embodiment of the invention is configured to correspond to the NOAA catalogue of charts, there is nothing in the nature of the invention which is inherently limited to the NOAA catalogue. Any reference to the catalogue of charts is not strictly limited to NOAA but to any Mercator projection of any section of the earth. For that reason, any reference to either of a chart or a catalogue of charts is not limited in any way to charts in the NOAA catalogue.

The Defense Mapping Agency ("DMA") assigns a number to every nautical chart used by the U.S. Navy, regardless of the organization producing the chart. Charts of foreign governments are also assigned numbers by DMA so that they may be filed in sequence with the DMA-produced charts. DMA charts have numbers consisting of one to five digits. The number of digits generally indicates the scale range, and the number itself indicates the geographical area covered by the chart. This chart numbering system, adopted by NOAA and National Geospatial-Intelligence Agency, provides for a uniform method of identifying charts published by both agencies. Nautical charts published by the National Geospatial-Intelligence Agency and by the Canadian Hydrographic Service are identified in the Coast Pilot by an asterisk preceding the chart number. Thus, in this nonlimiting embodiment of the invention, the legend 12 includes the DMA number as well as a verbose title for the subject matter of the chart. Though not necessary for the operation of the plotter 10, the legend 12 includes a statement of scale.

The plotter 10 is arranged about a principle axis 15 printed on a transparent substrate 12. Arranged sequentially along the axis 15 are three compass roses 24a, 24b, 24c equally spaced apart and aligned such that the axis 15 coincides with an alignment of each of the roses 24a, 24b, 24c own North/South orientation. In an alternative embodiment, the compass roses 24a, 24b, 24c includes a second concentric ring that is offset and thus oriented to reflect the magnetic deviation from true north in the particular chart for which the plotter is produced, known as magnetic declination. When so oriented, the second concentric ring facilitates the projection of courses and bearings from the East West lines on the chart anywhere. Magnetic declination is the angle between magnetic north (the direction the north end of a compass needle points) and true north. The declination is positive when the magnetic north is east of true north. Isogonic lines comprise specific locations where the declination has the same value, and the lines where the declination is zero are called agonic lines.

Magnetic declination is an expression of "the angle between the magnetic and geographic meridians at any place, expressed in degrees and minutes east or west to indicate the direction of magnetic north from true north. The angle between magnetic and grid meridians is called grid magnetic angle, grid variation, or grivation." Knowing the relevant magnetic declination for the area a subject chart depicts, the plotter 10 may be configured in a manner to allow direct plotting in accord with either lines of latitude and longitude or with isogonic lines drawn on a chart and thereby allows a mariner or aviator to navigate by translating the plotter 10 along either line and, thereby, move the plotter over the chart while maintaining its orientation on the Mercator projection the subject chart comprises.

One feature of the plotter 10 is the inclusion of the compass roses 24a, 24b, 24c, as well as crosshairs aligned to the four cardinal directions or cardinal points, the directions of north, south, east, and west, commonly denoted by their initials: N, S, E, W. The East/West crosshairs 27a are further graduated to reflect a convenient measure in accord with the stated scale for the relevant chart, in this case, tenths of miles along lines of latitude on the chart in question. Between each of the compass roses 24a, 24b, and 24c, a second identically graduated scale 27b is situated for the convenient use by the mariner or aviator.

Additionally, on opposing lateral edges of the plotter, there is another graduated scale 18 setting out distance along lines of latitude, the scale duplicating the graduations found on the East/West crosshair 27a. The scale 18 is labeled with the term "Latitude" to indicate the scale 18 to be meaningful along the lines of latitude and having an arrow to allow easy alignment along a line of latitude. A second scale 21 reflects distance along lines of longitude and is also suitably labeled with the term "Longitude" and has its own arrow for purposes of alignment. Just as with magnetic declination, the second scale 21, is unique to the portion of the Mercator projection the chart depicts.

Figure 2:
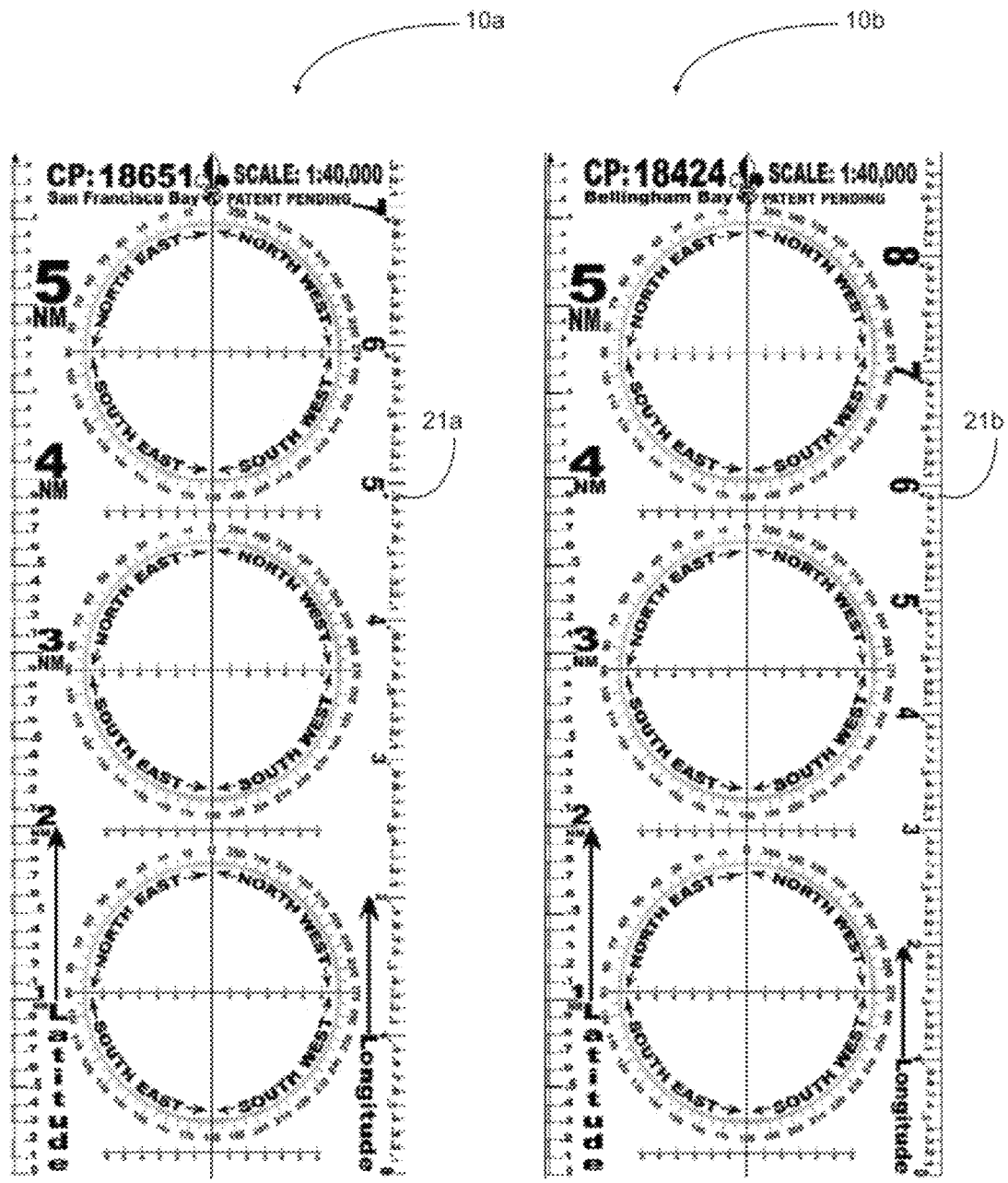
FIG. 2 depicts a comparison of two nonlimiting embodiments of the inventive plotter demonstrating the effect of displacement from the Equator on a longitude distance scale.

To demonstrate the uniqueness each of the plotters 10a and 10b, two are arrayed in FIG. 2, depicting two locations, San Francisco Bay 10a and a chart from some 750 miles to the north, Bellingham Bay 10b in Washington State. Each of the two plotters 10a, 10b are configured for charts drawn to a 1:40,000 scale. Yet, the second scale 21a for the plotter 10a configured for use on a chart depicting San Francisco Bay, is clearly such that a mile thereon is much longer than a mile on the second scale 21b, that for the plotter 10b for use on the chart depicting Bellingham Bay. As described in the Background section herein, to preserve the bearings struck on the surface of the earth, to be congruent to those as depicted in the Mercator projection, the scale must stretch as the location depicted is further displaced from the Equator.

Figure 3:
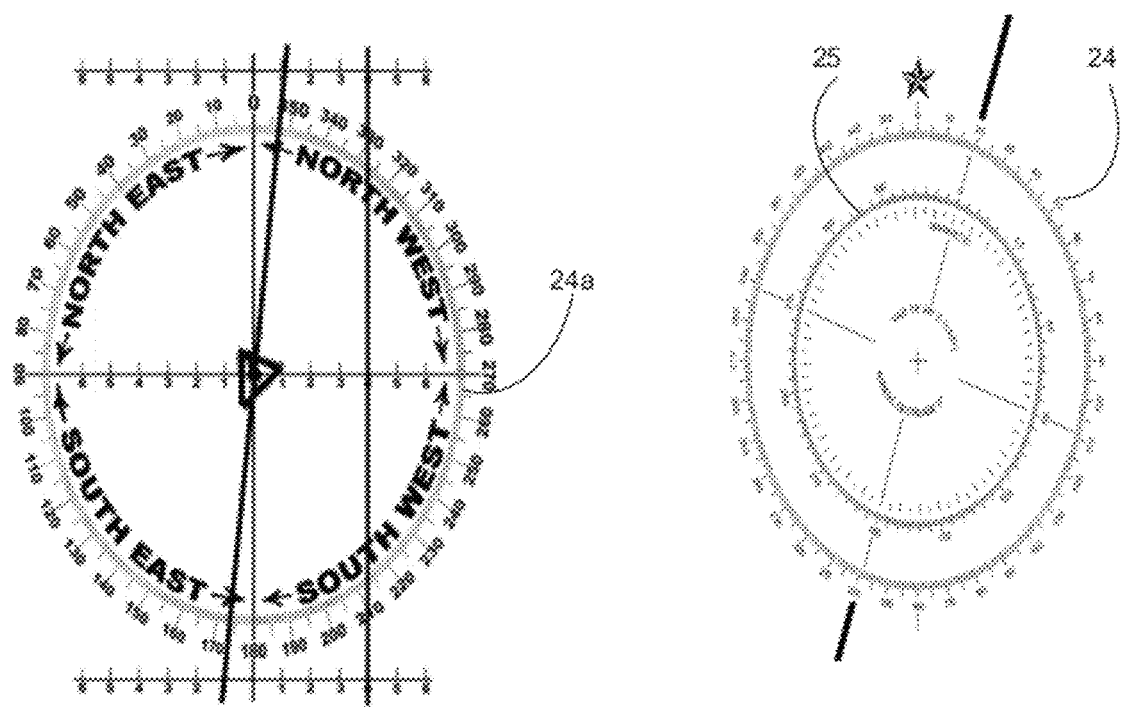
FIG. 3 depicts a comparison between a compass rose as printed on the inventive plotter and a compass rose indicating magnetic declination on a published NOAA chart.

A feature of the plotter that enables a method of use derives from exploitation of magnetic declination. In FIG. 3, the compass rose 24a of the preferred embodiment (FIG. 1) is compared to a compass rose 24 as that rose is commonly printed on a navigation chart. The standard chart compass rose is augmented by the presence of a concentric compass rose configured in accord with the noted magnetic declination at the time the chart was published. The inner chart compass rose 25 thus depicts magnetic north on the date of publication but this value changes in a predictable manner slightly over the years. By noting the age of the chart and following guidance that NOAA sets forth at the bottom of the magnetic compass rose the mariner or aviator can account for this variation and, having accounted for it, draw magnetic north (isogonic) lines indicating the direction a magnetic compass will indicate as North across the location the chart depicts. Thus, as a mariner uses a magnetic compass within the area the chart depicts, the magnetic needle will align with the lines the mariner has drawn across the chart.

Figure 4:
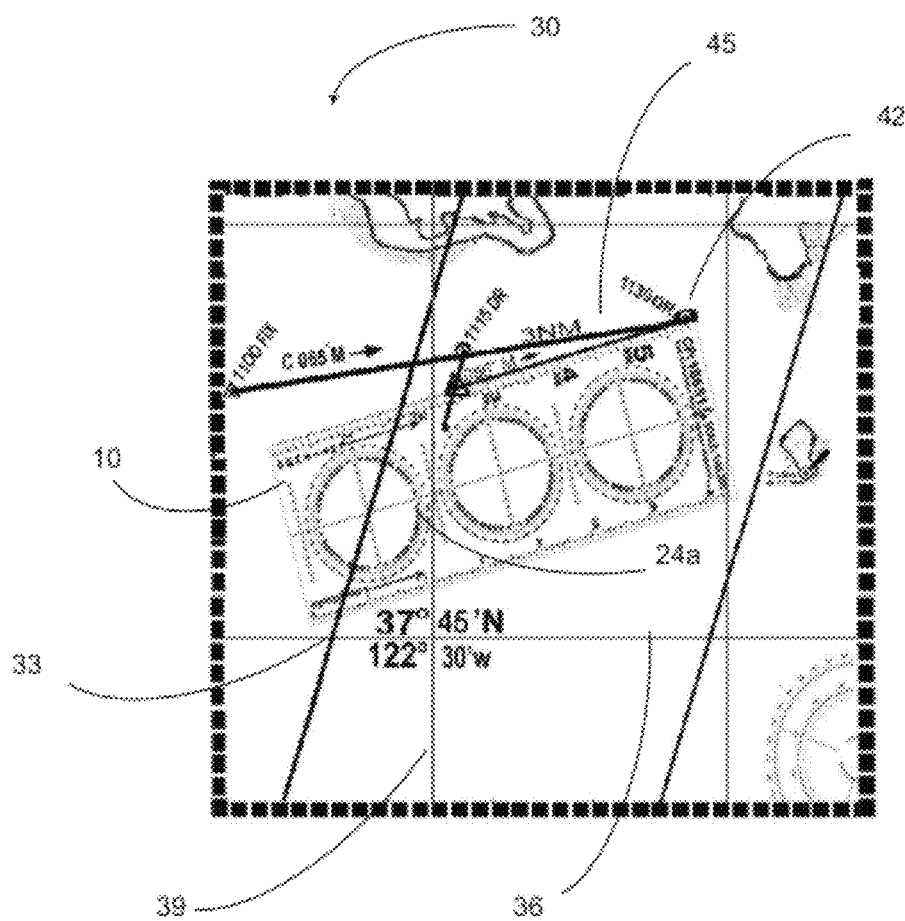
FIG. 4 is an exemplary use of the inventive plotter based upon a relationship between one compass rose and a scribed magnetic North line on a chart.

To exploit the virtues of the plotter 10, a relative angle of orientation between the chart at the plotter 10 is maintained, in order to transfer bearings and angles from the terrain to the chart for plotting. Unlike the Weems Plotter discussed in the background section, the orientation is not maintained by rollers in contact with the chart paper, but rather by use of the compass roses 24 relative to the one of the several fixed lines on the chart. In FIG. 4, the inventive plotter 10 is placed on a corresponding navigation chart 30. For the purposes of this nonlimiting example, magnetic navigation is presumed.

Because the plotter is used in the context of magnetic navigation, the navigator has scribed isogonic lines 33 to indicate magnetic north across the chart. For purposes of this example, the isogonic lines are used. When used in the context of navigating using true directions, the lines of latitude 36 and longitude 39 might be used with equal facility. But in this context and for this example, the isogonic lines 33 are more readily used for direct reckoning of bearings. Thus, where a known feature 42 is used for the basis of a "fix," the magnetic bearing read off of the compass in degrees is noted and recorded. Then on the chart, the appropriate isogonic line 33 is selected and the plotter 10 is placed upon the chart such that the isogonic line 33 passes through the plotter's compass rose 24a and the plotter is then rotated about the center of the compass rose 24a to a position such that the isogonic line 33 passes through the compass rose 24a at the angle of the noted magnetic bearing. A line is then scribed from the noted known feature 42 to and beyond an approximated position of the craft. In a similar manner as second known feature is used for a second bearing to yield a triangulated fix for the vessel.

Because the method is readily repeatable, once practice allows a navigator to gain facility with the plotter 10, rapid fixes are readily made. Also importantly, the plotter 10 allows for the reckoning of bearings, the laying of courses and the calculation of distances readily and without the otherwise necessary reference to the chart's own compass rose for dead reckoning using a compass for sightings and navigation.

Once the magnetic isogonic lines 33 are laid upon the chart, there is no further need of the compass rose, all information being derived between the isogonic lines 33 and the compass rose 24a of the plotter 10. With the isogonic lines 33 available, a small craft navigator can navigate on a folded chart exposing only the relevant features in the immediate proximity of the craft.

Figure 5:
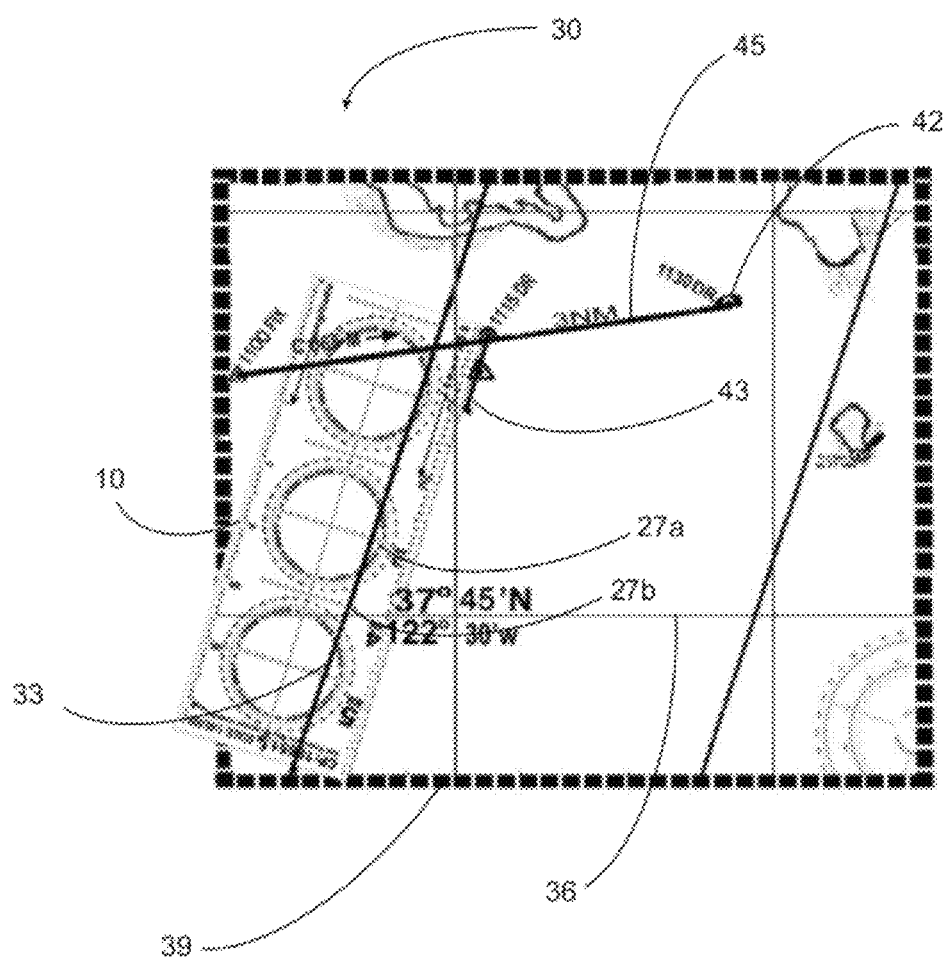
FIG. 5 is an exemplary use of the inventive plotter scribing a parallel line exploiting the several latitude distance scales on the plotter.

An additional set of features of the plotter 10 are the several offset scales of the East/West crosshairs 27a and graduated scale 27b, is depicted in FIG. 5. Given any known line across the chart 30 such as the isogonic line 33, a parallel line 43 is readily drawn by offsetting the plotter 10 from the isogonic line 33 by using intersection points across the scales 27a, 27b by matching the offsetting distance shown. As such, the laying down of parallel lines is easily accomplished.

These several features of the plotter 10 show it to be an extraordinarily useful navigation tool. The explanation set forth here is abbreviated and not intended to serve as a primer for the use of the plotter 10 but rather demonstrates the several basic uses of the plotter 10 in conjunction with the chart to perform the necessary steps of dead reckoning navigation. Such a primer exists and which copyright has been suitably registered under the name of the inventor with the Library of Congress' copyright office. Nonetheless, the explained translation of the plotter 10 across the chart in accord with the features of the plotter 10.

Figure 6:
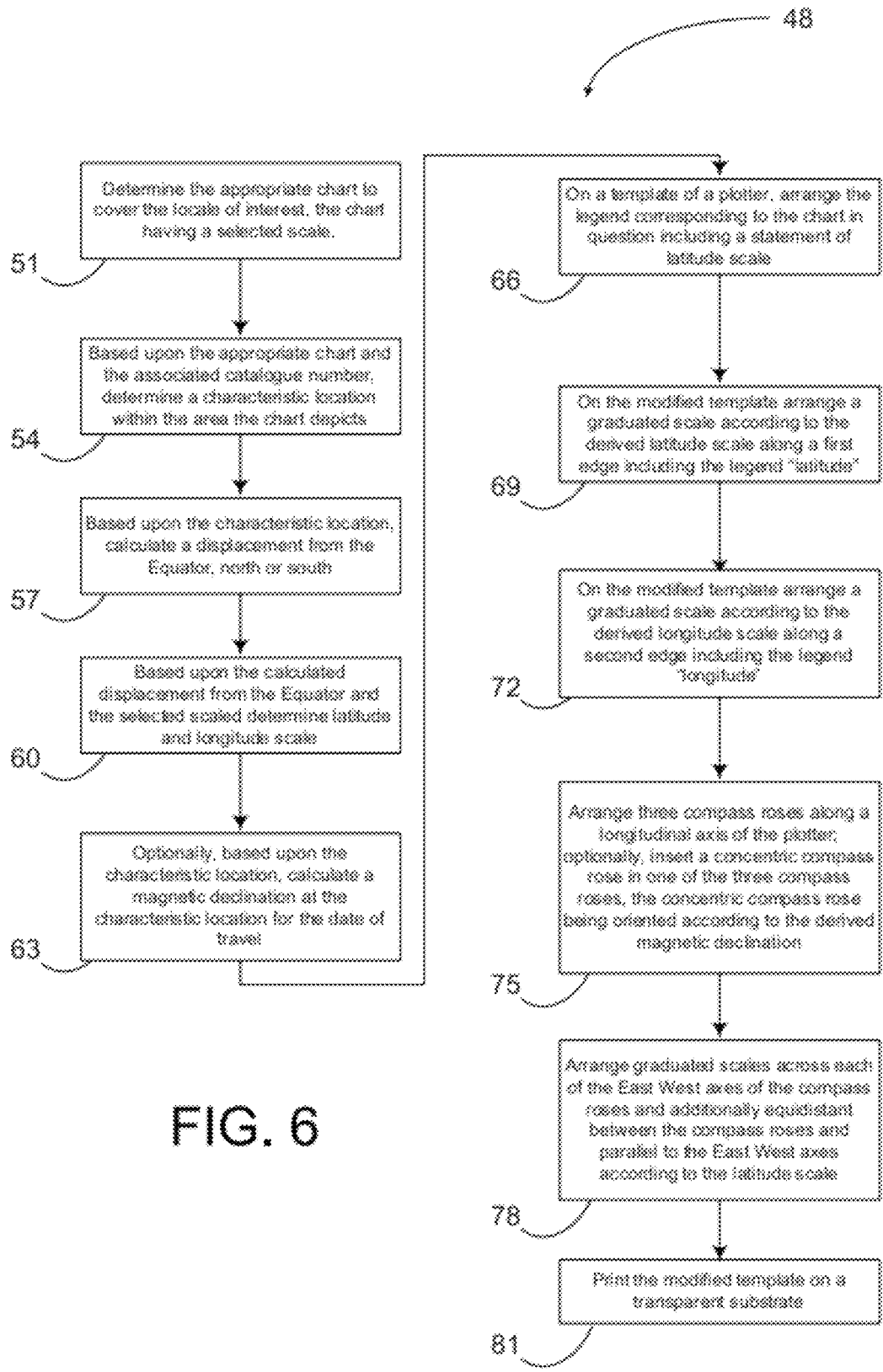
FIG. 6 is a flowchart of the inventive method of constructing for print on a transparent planar substrate an embodiment of the inventive plotter.

Referring to FIG. 6, a method 48 for producing a chart-specific plotter 10 (FIG. 1) includes determining a suitably chart for navigation in a particular location. As with every navigation chart, any intended navigational track may include one or more navigational charts. For purposes of this explanation, an exemplary discussion is suitably limited to the production of a single plotter. As in traditional navigation, the problem of dead reckoning is one that can easily be broken down into several distinct subroutines, each of them tied to a single chart. For purposes of the explanation, this same atomization of the method is appropriate as the plotters bear a one-to-one correspondence to the charts of any index. Should a new chart be published, a new and characteristic plotter is readily configured to suitably navigate within the newly published chart. Thus, no limitation should be inferred from the single chart discussion set forth herein. A single chart solution well describes the multiple chart solution as a specific iteration of a multiple iteration method.

For any NOAA, or, in fact, other publisher's chart, there is a covered area, having specific boundaries, specific displacement from the Equator, and a known magnetic declination. Once a chart is selected for navigation, at a block 51, geographic characteristics of the covered area are readily identified by the chart's corresponding catalogue number. In one nonlimiting embodiment, a lookup table stored as nonvolatile machine-readable data in a database readily enables the method. Once a catalogue number is determined, the characteristics of the location are also readily known. For each catalogue number, there is a latitude, longitude, and magnetic declination as of a particular date and time. Those numbers inform the method as a result chart selection.

At a block 54, the method determines a characteristic location corresponding to the chart location. Most often, a characteristic location is selected to be the geometric center of the characteristic chart. As such, the characteristic location suitably reflects an average displacement from the Equator, an average magnetic declination, an average latitude and an average longitude for the collection of locations the chart depicts. In an alternate method, selection of any location will suitably show minimal deviation from each of the averages and, for purposes of navigation, will not meaningfully degrade the use of the plotter.

A displacement from the Equator results from the selection of a characteristic location, at a block 57. Similarly, latitude and longitude distortion is readily calculated based upon that displacement from the Equator at a block 60.

The standard equation for a Mercator projection determines the x- and y-coordinates of a point on the resulting chart based upon the angle of latitude $\phi$ and longitude $\lambda$.

$$x = \lambda - \lambda_0$$
$$y = \ln\left(\tan\left(\frac{\pi}{4} + \frac{\varphi}{2}\right)\right)$$
$$= \frac{1}{2}\ln\left(\frac{1 + \sin(\varphi)}{1 - \sin(\varphi)}\right)$$
$$= \sinh^{-1}(\tan(\varphi))$$
$$= \tanh^{-1}(\sin(\varphi))$$
$$= \ln(\tan(\varphi) + \sec(\varphi)).$$

In one optional embodiment, at a block 63, a magnetic declination is also determined based upon both of the characteristic location and the time for navigation. Magnetic declination varies predictably over time and location. An instantaneous declination is readily determined based upon the time and location and is readily determined, for example, an enabling disclosure is found at the NOAA National Geophysical Data Center (http://www.ngdc.noaa.gov/geomag-models/Declination.jsp). In such a manner, a second look-up table will readily enable a magnetic declination engine for supplying an exact declination corresponding to a sailing time.

At a block 66, a template of the plotter is stored in nonvolatile memory for recall to construct a final plotter image. The plotter image template is configured for printing on a known printer calibrated to suitably print the template image at an exact and known proportion or correction factor. For purposes of this discussion, the correction factor is presumed to be one or unity, meaning that where the image is printed, a unit measure, such as an inch on the template will be printed to be exactly one inch long. As such, the template as printed will be exactly the same size as the template as stored. Where the correction factor is distinct from unity, the lengths will be proportioned by the correction factor to assure that the plotter as printed on substrate will be exactly and specifically determined.

As indicated above, the plotters are configured for a specific chart for use by human navigators. As such, to assist a navigator where a navigation track, at a block 66, is laid over several charts, the plotter template is modified to include a legend indicating the chart to which the plotter corresponds (as in the plotter 10, FIG. 1 "CP:18424 Scale 1:40,000, Bellingham Bay"), and, optionally, the scale corresponding to the scale on the published chart. In another optional embodiment of the plotter, the plotter may be configured with a verbose name the navigator has selected to reflect the unique identity of the corresponding chart.

For purposes of the production of template to specifically correspond with the selected chart, at a block 69, a graduated scale is supplied for incorporation into the template; the graduated scale is selected to portray a latitude scale according to the Mercator projection and scale. The scale is then laid into the template on a first edge of the plotter template to produce a modified template having the latitude readily placed for use in dead reckoning navigation. For purposes of informing the navigator, a legend "latitude" and optionally, an arrow is used to identify the graduated scale on the first edge of the template.

At a block 72, a longitude is similarly placed on a second edge of the modified template for inclusion in an ultimate template image for printing on a transparent substrate at a block 81 below. For the further purposes of informing the navigator, a legend "longitude" and optionally, an arrow is used to identify the graduated scale on the second edge of the template.

At a block 75, three compass roses are arranged along a central axis 15 (FIG. 1) of the plotter, the axis being included in the template to bisect the template along its longest dimension. Each compass rose is, thus, arranged such that the axis passes through each North/South cardinal points of the compass roses such that the compass roses are "stacked" on the axis.

At a block 78, the latitude scale derived in connection with the scale arranged in the block 66, is then arranged to span the East/West ordinal points of each of the three compass roses. Optionally, two additional latitude scales are arranged in the interspace between the compass roses and parallel to those in the three compass roses.

As a further option, the magnetic declination determined in the block 63 might be used to print a magnetic North to bisect the True North the central axis 15 depicts at the centralmost of the three compass roses making the rapid scribing of magnetic lines over the chart a very easy exercise for the navigator. For small craft navigation these lines are especially important for orienting the compass roses for use in striking bearings of landmarks when navigating. Alternatively, a second compass rose might surround concentrically any of the first three compass roses and be angularly offset to reflect magnetic declination. In either embodiment, the purposes is to make the magnetic bearings readily available when navigating. As such, modifications to the template are complete and one embodiment of the plotter might be printed to transparent substrate at a block 81.

In a second embodiment of the plotter, a second compass rose is added arranged as a concentric circle encompassing one of the compass roses to readily provide declination to the navigator. The second compass rose is oriented at exactly the magnetic declination at the block 63 relative to the first compass rose it encircles. In still another embodiment a magnetic axis is arranged to intersect the centralmost of the three compass roses places at the block 75. The placement of the axis readily allows the scribing of magnetic north lines over the chart at the outset of navigation to readily provide magnetic north lines for sighting bearings according to a magnetic compass.

Any of the embodiments of the invention are suitably printed on the transparent substrate for use as a plotter. In at least one embodiment, the substrate is provided to include die cut holes to allow ready striking of a North/South line on the chart. Additional optional embodiments include plotters printed on substrate including notching for the opposing ends where the principal axis intersects the third and fourth edges of the plotter.

Figure 7:
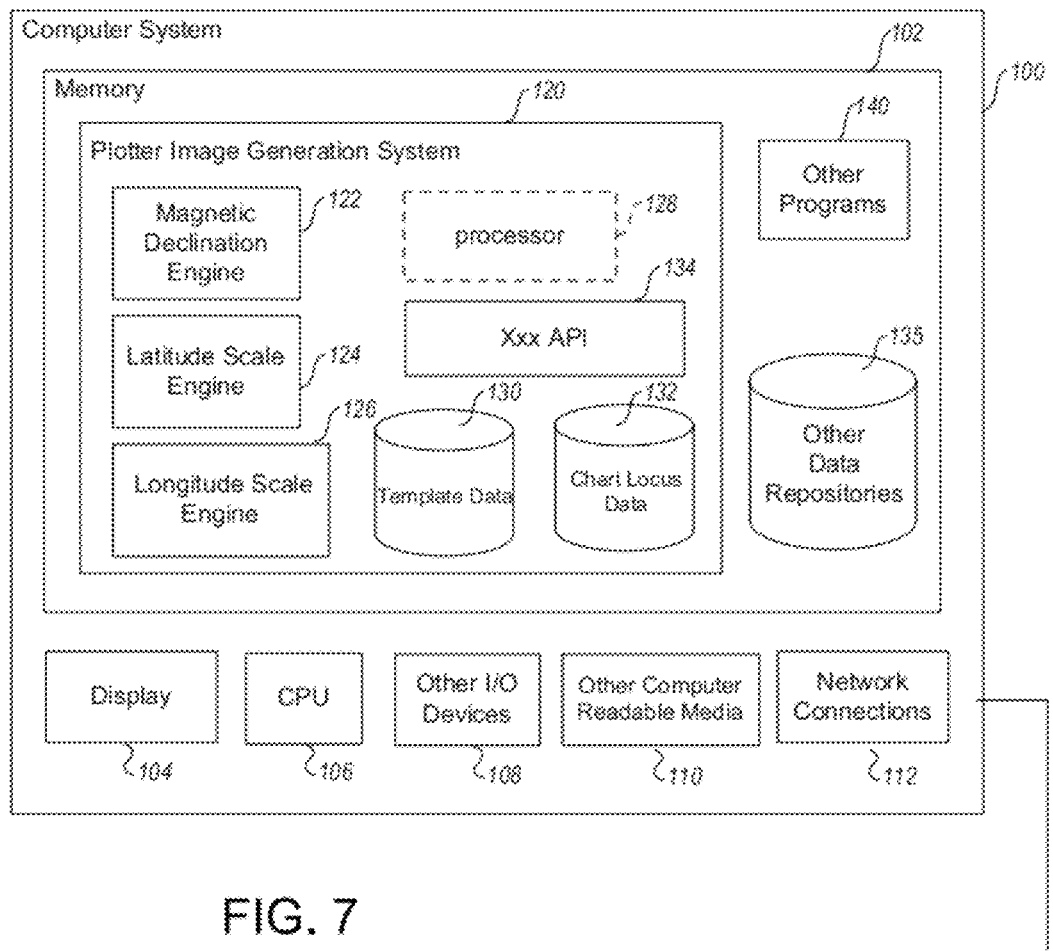
FIG. 7 is an exemplary computer for generating the inventive plotter on demand.
Figure 7:
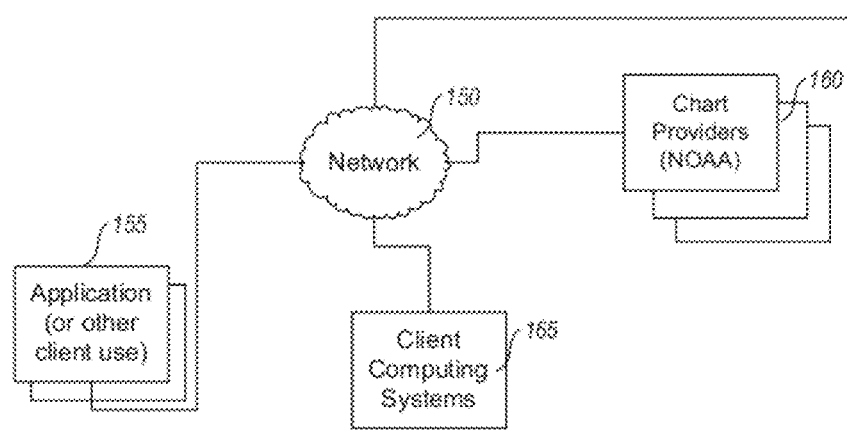

FIG. 7 is a block diagram of an example computing system that may be used to practice embodiments of a method for producing the inventive plotter described herein. Note that either of a general purpose or a special purpose computing system either of which is suitably instructed may be used to suitably configure and then to produce the inventive plotter. A machine (not pictured) such as a printer is necessary to produce the plotter on a transparent substrate. Further, aspects of the inventive method may be implemented in software, hardware, firmware, or in some combination to achieve the capabilities described herein.

The computing system 100 may comprise one or more server or client computing systems and may span distributed locations. In addition, each block shown may represent one or more of the described mechanisms acting singly or in concert, as appropriate. Similarly, in a specific embodiment functionality of two or more blocks may be combined in a single mechanism having all of the functionality of the several described blocks. Moreover, the various blocks of a Plotter Image Generation System 120 may physically reside on one or more machines, which use standard (e.g., TCP/IP) or proprietary interprocess communication mechanisms to communicate with each other.

In the embodiment shown, computer system 100 comprises a computer memory ("memory") 102, a display 104, one or more Central Processing Units ("CPU") 106, Input/Output devices 108 (e.g., keyboard, mouse, CRT or LCD display, etc.), other computer-readable media 110, and one or more network connections 112. The <initials> Y10 is shown residing in memory Y01. In other embodiments, some portion of the contents, some of, or all of the components of the Plotter Image Generation System 120 may be stored on or transmitted over the other computer-readable media 110. The components of the Plotter Image Generation System 120 preferably execute on one or more CPUs 106 and manage the generation and use of compass roses and graduated scales for the plotter, as described herein. Other code or programs 140 and potentially other data repositories, such as data repository 112, also reside in the memory 102, and preferably execute on one or more CPUs 106. Of note, one or more of the components in FIG. 8 may not be present in any specific implementation. For example, some embodiments embedded in other software may not provide means for user input or display.

In a typical embodiment, the Plotter Image Generation System 120 includes one or more Magnetic Declination Engines 122, one or more Latitude Scale Engines 124, and Longitude Scale Engines 126. In at least some embodiments, the actual graphic compiling of the plotter consistent with template data stored in a template data database 130 is provided external to the Plotter Image Generation System 120 based upon information generated within the Plotter Image Generation System 120 and is available, potentially, over one or more networks 150. Other or different modules may be implemented. In addition, the Plotter Image Generation System 120 may interact via a network 150 with application or client code 155 that binds the information necessary to print Plotter graphic on the transparent substrate to information provided by a chart provider such as NOAA to produce a complete package for use, assuring that plotters are suitably mated with the appropriate charts; one or more client computing systems 160, or one or more third-party information provide systems 165, such as a third party charter company providing custom chart sets for customers based upon intended trips, might optionally augment the system to appropriately brand the plotters as produced. Also, of note, the chart locus data repository 132 may be provided external to the Plotter Image Generation System 120 as well, for example in a NOAA data API accessible over one or more networks 150 and responsive to a callout from the Plotter Image Generation System 120.

In an example embodiment, components/modules of the Plotter Image Generation System 120 are implemented using standard programming techniques. However, because of the highly graphic nature of the output, a third party graphic program or extensions from a program such as Adobe™ Illustrator™ might be used for generation of the plotter's final graphic form. Additionally, a range of programming languages known in the art may be employed for implementing such example embodiments, including representative implementations of various programming language paradigms, including but not limited to, object-oriented (e.g., Java, C++, C#, Smalltalk, etc.), functional (e.g., ML, Lisp, Scheme, etc.), procedural (e.g., C, Pascal, Ada, Modula, etc.), scripting (e.g., Perl, Ruby, Python, JavaScript, VBScript, etc.), declarative (e.g., SQL, Prolog, etc.), etc.

The embodiments described above may also use well-known or proprietary synchronous or asynchronous client-server computing techniques. However, the various components may be implemented using more monolithic programming techniques as well, for example, as an executable running on a single CPU computer system, or alternately decomposed using a variety of structuring techniques known in the art, including but not limited to, multiprogramming, multithreading, client-server, or peer-to-peer, running on one or more computer systems each having one or more CPUs. Some embodiments are illustrated as executing concurrently and asynchronously and communicating using message passing techniques. Equivalent synchronous embodiments are also supported by an <system initials> implementation.

In addition, programming interfaces to the data stored as part of the Plotter Image Generation System 120 (e.g., in the data repositories 132 and 134) can be available by standard means such as through C, C++, C#, and Java APIs; libraries for accessing files, databases, or other data repositories; through scripting languages such as XML; or through Web servers, FTP servers, or other types of servers providing access to stored data. The template database 130 and the chart locus database 132 may be implemented as one or more database systems, file systems, or any other method known in the art for storing such information, or any combination of the above, including implementation using distributed computing techniques.

Also the example Plotter Image Generation System 120 may be implemented in a distributed environment comprising multiple, even heterogeneous, computer systems and networks. For example, in one embodiment, the Magnetic Declination Engine, the Latitude and Longitude Scale Engines 124, 126, and the template and chart data repositories 130, 132 are all located in physically different computer systems. In another embodiment, various modules of the Plotter Image Generation System 120 are hosted each on a separate server machine and may be remotely located from the tables which are stored in the Other data repositories 135. Also, one or more of the modules may themselves be distributed, pooled or otherwise grouped, such as for load balancing, reliability or security reasons. Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) etc. Other variations are possible. Also, other functionality could be provided by each component/module, or existing functionality could be distributed amongst the components/modules in different ways, yet still achieve the functions of a Plotter Image Generation System 120.

Furthermore, in some embodiments, some or all of the components of the Plotter Image Generation System 120 may be implemented or provided in other manners, such as at least partially in firmware and/or hardware, including, but not limited to one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as executable or other machine readable software instructions or structured data) on a computer-readable medium (e.g., a hard disk; a memory; a network; or a portable media article to be read by an appropriate drive or via an appropriate connection). Some or all of the system components and data structures may also be transmitted via generated data signals (e.g., as part of a carrier wave or other analog or digital propagated signal) on a variety of computer-readable transmission mediums, such as media Y05, including wireless-based and wired/cable-based mediums, and may take a variety of forms (e.g., as part of a single or multiplexed analog signal, or as multiple discrete digital packets or frames). [alternative: . . . may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames).] Such computer program products may also take other forms in other embodiments. Accordingly, embodiments of this disclosure may be practiced with other computer system configurations.

While the preferred embodiment of the invention has been illustrated and described, as noted above, many changes can be made without departing from the spirit and scope of the invention. For example, the substrate might be tinted to emphasize sounding markings or other benchmarks of the navigational chart. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A navigational plotter for use with a selected navigational chart, the plotter comprising:
   a generally transparent elongated planar straight edge member having each of a first and a second straight edges parallelly disposed opposite one another bounding a generally rectangular interior surface,
   a printed central axis bisecting the rectangular interior surface and arranged to be parallel to each of the first and second straight edges;
   at least one compass rose arranged to have its North/South ordinal points to lie upon the printed central axis;
   a plurality of instances of a first distance scale being calibrated in accord with the scale of the selected chart along a selected line of latitude, one instance of the first distance scale being printed to span the East/West ordinal points on the at least one compass rose and a second instance of the first distance scale being printed along the first straight edge;
   a second distance scale being calibrated in accord with the scale of the selected chart along a selected segment of a line of longitude according to a Mercator projection of the selected chart, an instance of the second scale being printed along the second straight edge; and
   a magnetic North indicator printed upon the rectangular interior surface to intersect the central axis at one instance of the at least one compass rose and to be angularly displaced from the central axis by an angle equivalent to a derived magnetic declination on a selected date.

2. The navigational plotter of claim 1, wherein the at least one compass rose is three compass roses disposes with equal distance along the central axis.

3. The navigational plotter of claim 1 wherein the magnetic North Indicator includes die cut holes arranged generally at opposing ends of the indicator to aid the navigator in constructing lines spanning the chart indicative of the magnetic declination.

4. The navigational plotter of claim 1, wherein the first distance scale is also printed in at least one second instance outside the at least one compass rose and arranged to be parallel and of equal length to the instance of the first scale being printed to span the East/West ordinal points and such that the central axis bisects the second instance.

5. The navigational plotter of claim 1, wherein the plotter bears a legend indicating at least one of the group comprising the catalogue number for the selected chart, and the verbose name of the selected chart, the scale of the selected chart.

6. A method for printing on a transparent planar substrate a plotter for use on a selected navigation chart comprises:
determining a characteristic location the chart depicts and a scale in which the chart is expressed;
determining the distance and direction of the characteristic location's displacement from the Equator;
deriving each of a latitude and a longitude distance scale based upon the displacement from the Equator;
retrieving a signal from a nonvolatile machine readable memory a generally rectangular plotter template including a central axis disposed along the template, equidistant and parallel to two straight edges of the template, at least one compass roses is arranged on the central axis such that the North and South ordinal points rest on the central axis;
amending the template to include the longitude distance scale arranged at the first straight edge and one instance of the latitude distance scale arranged at the second straight edge and a second instance of the latitude distance scale arranged to span the distance from the East to the West ordinal points of the at least one compass rose; and
printing the amended template upon the transparent planar substrate with a correction factor such that the latitude scale coincides with the latitude scale printed on the selected chart.

7. The method of claim 6, wherein the amending the template includes the arranging of a magnetic North indicator such that the indicator is angularly displaced from the central axis to indicate the magnetic declination at the characteristic location on a selected date.

8. The method of claim 7 wherein the magnetic North Indicator includes die cut holes arranged generally at opposing ends of the indicator to aid the navigator in constructing lines spanning the chart indicative of the magnetic declination.

9. The method of claim 6, wherein the at least one compass rose is three compass roses disposes with equal distance along the central axis.

10. The method of claim 6, wherein the first distance scale is also printed in at least one second instance outside the at least one compass rose and arranged to be parallel and of equal length to the instance of the first scale being printed to span the East/West ordinal points and such that the central axis bisects the second instance.

11. The method of claim 6, wherein amending the template includes the placement of a legend indicating at least one of the group comprising the catalogue number for the selected chart, and the verbose name of the selected chart, the scale of the selected chart.

12. A method for printing a plotter based upon a request from a client computer in communicative connection with a computer system over a network comprises:
receiving a request for a plotter image for printing, the request being received at a computer by means of a network connection and including a selected chart identifier;
based upon the received selected chart identifier, retrieving from a chart locus database, a characteristic location the selected chart depicts and a scale in which the chart is expressed;
retrieving the distance and direction of the characteristic location's displacement from the Equator from the chart locus database;
deriving each of a latitude and a longitude distance scale based upon the displacement from the Equator;
retrieving a signal from a nonvolatile machine readable memory a generally rectangular plotter template including a central axis disposed along the template, equidistant and parallel to two straight edges of the template, at least one compass roses is arranged on the central axis such that the North and South ordinal points rest on the central axis;
amending the template to include the longitude distance scale arranged at the first straight edge and one instance of the latitude distance scale arranged at the second straight edge and a second instance of the latitude distance scale arranged to span the distance from the East to the West ordinal points of the at least one compass rose;
transmitting the amended template image through a network connection to a client computer; and
printing, at the client computer, the amended template upon the transparent planar substrate with a correction factor such that the latitude scale coincides with the latitude scale printed on the selected chart.

13. The method of claim 12, wherein the amending the template includes the arranging of a magnetic North indicator such that the indicator is angularly displaced from the central axis to indicate the magnetic declination at the characteristic location on a selected date.

14. The method of claim 12 wherein the magnetic North Indicator includes die cut holes arranged generally at opposing ends of the indicator to aid the navigator in constructing lines spanning the chart indicative of the magnetic declination.

15. The method of claim 12, wherein the at least one compass rose is three compass roses disposes with equal distance along the central axis.

16. The method of claim 12, wherein the first distance scale is also printed in at least one second instance outside the at least one compass rose and arranged to be parallel and of equal length to the instance of the first scale being printed to span the East/West ordinal points and such that the central axis bisects the second instance.

17. The method of claim 12, wherein amending the template includes the placement of a legend indicating at least one of the group comprising the catalogue number for the selected chart, and the verbose name of the selected chart, the scale of the selected chart.

18. The method of claim 12, wherein the client computer is a vending machine configured to include an attached printer to sell maps.

19. The method of claim 18, wherein the client computer is further configured to print charts for use with the plotter based upon the request.

20. The method of claim 12, wherein the request being received at a computer by means of a network connection wherein the request included user identifying data and wherein the method further comprises retrieving user account information based upon the user identifying data.

* * * * *